Figure 1:
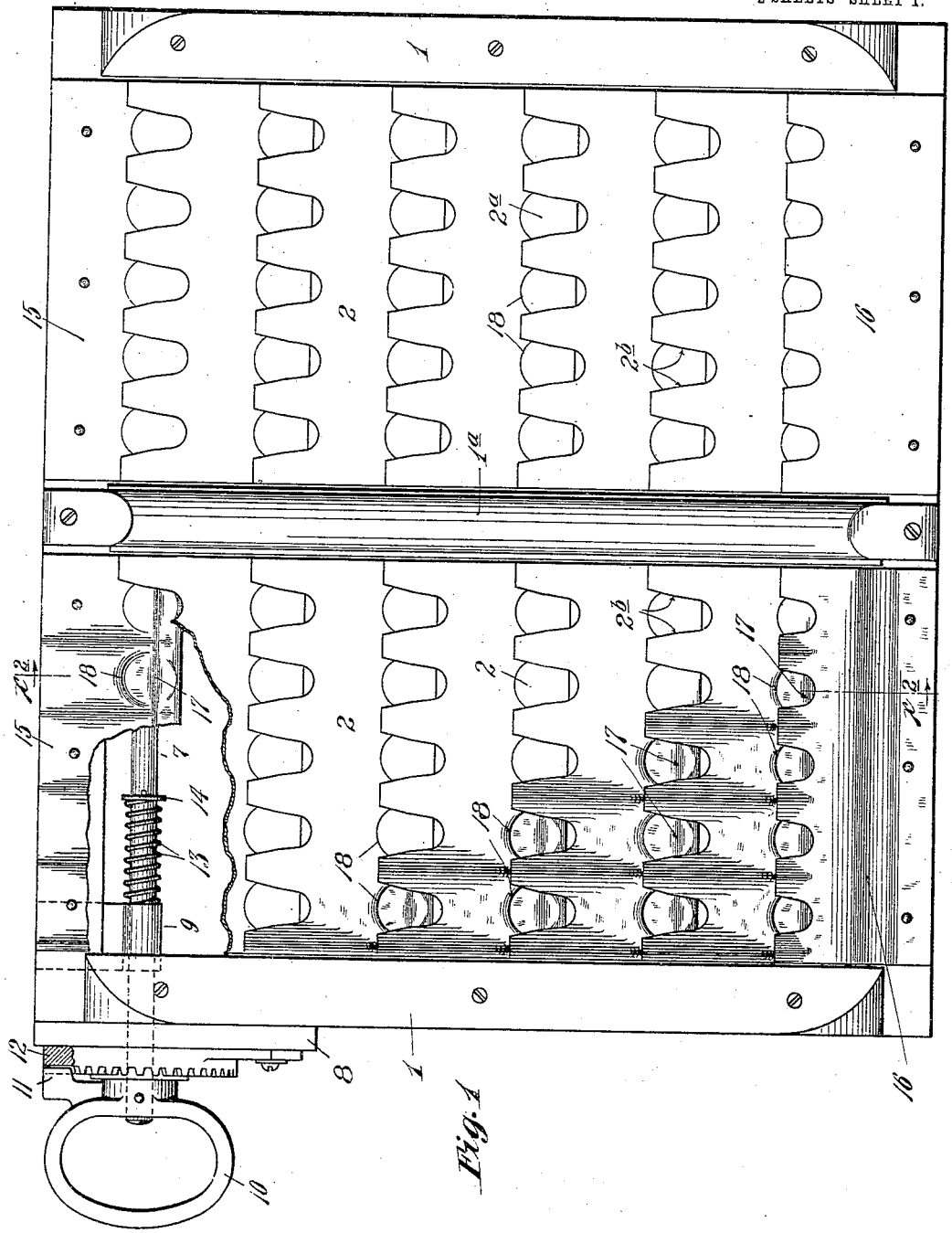

No. 873,719. PATENTED DEC. 17, 1907.
C. CLOSZ.
ADJUSTABLE SIEVE.
APPLICATION FILED JAN. 13, 1906.

2 SHEETS—SHEET 1.

Witnesses.
E. W. Jeppesen.
A. H. Opsahl.

Inventor:
Charles Closz.
By his Attorneys.
Williamson Merchant

No. 873,719. PATENTED DEC. 17, 1907.
C. CLOSZ.
ADJUSTABLE SIEVE.
APPLICATION FILED JAN. 13, 1906.
2 SHEETS—SHEET 2.
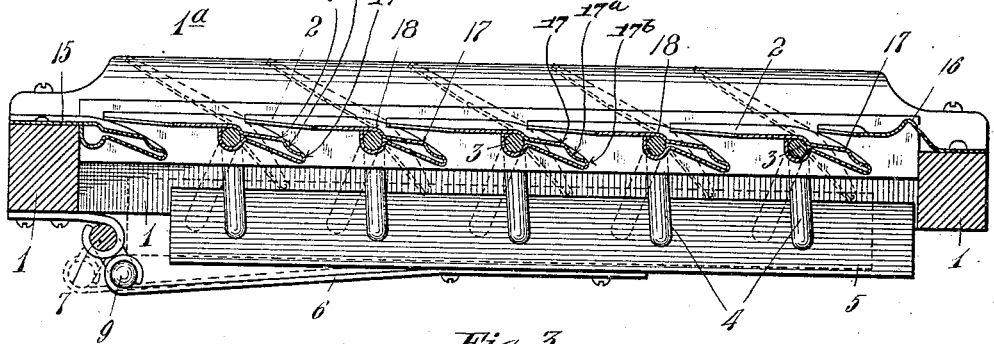
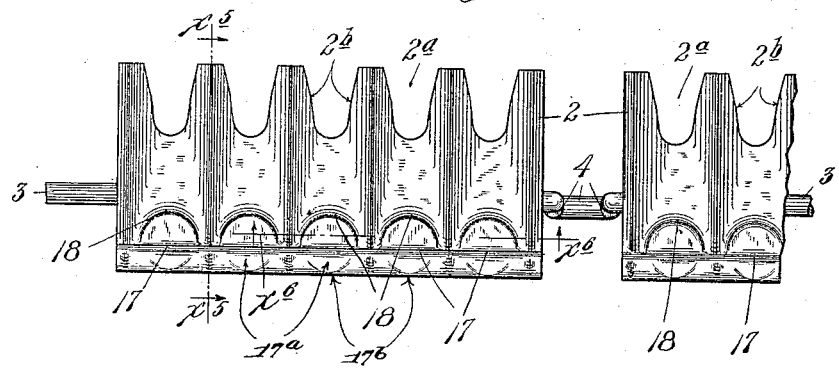
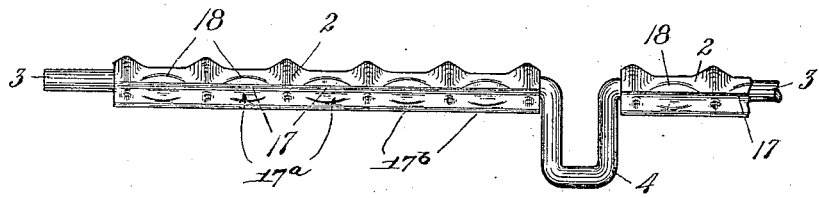
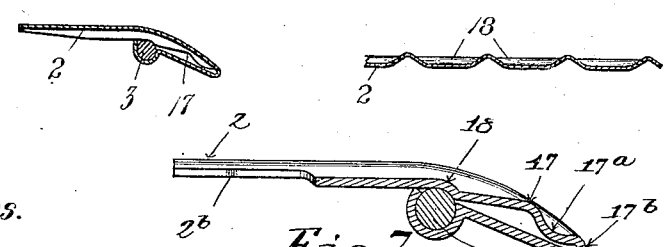
Witnesses.
E. W. Jeppesen.
A. H. Opsahl.
Inventor.
Charles Closz.
By his Attorneys.
Williamson & Merchant

UNITED STATES PATENT OFFICE.

CHARLES CLOSZ, OF WEBSTER CITY, IOWA.

ADJUSTABLE SIEVE.

No. 873,719.   Specification of Letters Patent.   Patented Dec. 17, 1907.

Application filed January 13, 1906. Serial No. 295,871.

*To all whom it may concern:*

Be it known that I, CHARLES CLOSZ, a citizen of the United States, residing at Webster City, in the county of Hamilton and State of Iowa, have invented certain new and useful Improvements in Adjustable Sieves; and I do hereby declare the following to be a full, clear, and exact description of the invention, such as will enable others skilled in the art to which it appertains to make and use the same.

My present invention relates to that class of adjustable sieves that are made up of overlapped sheet metal sections, and has for its object to improve the same in the several particulars hereinafter noted. A sieve of the general character above indicated is disclosed in my prior patent #698,258, of date April 22, 1902.

The sieve herein illustrated and claimed is especially adapted, under certain adjustments, to separate wheat and other grains from chaff, short straws, white-caps and so forth, and, under other adjustments, to separate small seeds, like timothy seeds, from heads, husks and broken stems, etc.

The invention is illustrated in the accompanying drawings, wherein like characters indicate like parts throughout the several views.

Figure 1 is a plan view, with some parts broken away, showing a sieve embodying the features of my invention. Fig. 2 is a section taken on the line $x^2 x^2$ of Fig. 1. Fig. 3 is a plan view, showing in detail one of the slats or sections of the sieve, some parts being broken away. Fig. 4 is a rear elevation of the slats shown in Fig. 3. Fig. 5 is a detail taken in section on the line $x^5 x^5$ of Fig. 3; Fig. 6 is a detail taken in section on the line $x^6 x^6$ of Fig. 3, and Fig. 7 is an enlarged detail taken through one of the slats on the line $x^2 x^2$ of Fig. 1.

The numeral 1 indicates a rectangular supporting frame of the sieve, the same, as shown, having a central bar $1^a$. The numeral 2 indicates, as an entirety, the metallic slats or sections of the sieve, which sections are secured to rock shafts 3, are suitably mounted in the sides of said frame, and are provided with U-shaped cranks 4 at their central portions. A push bar 5 pivotally connects the cranks 4, and is itself connected to a link 6.

The numeral 7 indicates an adjusting rod which is mounted for rotary and sliding movements in a block 8 on one side of the sieve frame 1, and is provided, at its inner end, with a back-turned crank 9 that works pivotally and slidably within the free end of the link 6. At its outer end, the adjusting rod 7 is provided with a hand piece 10 and with a beveled retaining lug 11, which latter coöperates with a notched retaining ring 12 secured on the block 8, to hold the adjusting rod 7 in any position in which it may be set, and hence, the sieve sections in any position in which they may be set. A coiled spring 13 on the rod 7, reacts against one side of the frame 1 and against a washer 14 secured on said rod, to normally hold the lug 11 engaged with the teeth of the retaining ring 12.

The slats 2 extend transversely of the line of travel of the stock, and are corrugated, and between the ribs of the corrugation, are formed with diverging notches $2^a$ that extend from their front edges back preferably more than half way to the axes of the respective rock shafts 3. It will be noted that the notches $2^a$ flare in a direction toward the forward edges of the slats at one angle to the points marked $2^b$, and that they flare with an increased angle of divergency from said points $2^b$ to the forward edges of the said slats. This is done for an important purpose which will hereinafter appear. The finger portions formed between the notches $2^a$ are rounded upward in cross-section, but in the direction of the travel of the stock, their upper portions extend on straight lines. Furthermore, the fingers of the several sections or slats are alined in the direction of the travel of the stock, so that they form a plurality of approximately continuous ridges, with intervening channels, and with the notches $2^a$ lying within said channels.

Those portions of the slats 2 that extend rearward of the respective rock shafts, are imperforate, and are bent downward at an angle with respect to the planes of the corresponding finger portions. To the front and rear transverse bars of the frame 1 are rigidly secured other metallic slats 15 and 16 respectively, the former of which has no fingers or notches, and the latter of which is provided with fingers and notches of the character already indicated.

In this application, as in the companion application filed of even date herewith, and entitled "Adjustable sieves," the notches $2^a$ of the overlapping slats 2 extend backward beyond or rearward of the rear edges of the slats which they overlap, so that the grain or seed may freely fall directly and vertically through the sieve openings afforded thereby. This feature is, however, broadly claimed in my said companion application.

As will be seen by reference particularly to Fig. 5, the rearwardly inclined portions of the slats are also corrugated. It is important here to note that the said rearwardly inclined portions of said slats are formed with secondary or intermediate dividing ribs or ridges 17 which rise within the channels of the corrugations and, as shown, run out at the tops of the ridges or highest portions of said corrugations. In this preferred construction, these dividing ridges 17, it will be noted, extend or lie immediately below the points marked 2$^b$, to-wit, the points where the greatest divergency of the notches 2$^a$ begins. Immediately over the rock shafts 3, where the forwardly and rearwardly extended portions of the slats meet, at an angle, is a main or primary dividing ridge 18.

By reference particularly to Fig. 7, it will be noted that the rear portions of the slats, just at the rear of the so-called "secondary" dividing ridges 17, are formed with depressions 17$^a$ which leave raised ribs or abutments 17$^b$ at the extreme rear edges of the said slats.

When the sieve is to be used for the separation of wheat from chaff and other foreign material, it should be adjusted substantially as shown by dotted lines in Fig. 2. When the sections are thus adjusted, the rear portions of said sections, and the dividing ridges 17 thereof, it will be turned downward so far that the line of division between the material which will be moved forward and that which will drop rearward, will be at the primary dividing ridge 18. It will, of course, be understood that the forward movement of the stock over the sieve, when the latter is placed within a separator or threshing machine, will be due partly to an air blast and partly to the propelling action of the sieve surface.

When the fingers of the sieve sections or slats are turned upward, as just described, the entire portions of the notches 2$^a$ are caused to act as sieve meshes or passages, so that it will be seen that under this adjustment, long and wide sieve meshes or passages are provided. At the same time, in view of the increased divergency of the outer portions of the notches, the channels formed between the fingers or ridges are made wider than if less divergency were given to the said notches.

For the separation of small seeds, such as timothy seed, from stocks, husks and other foreign materials, a narrower and shorter sieve opening or mesh than those provided for the separations or adjustments of the sieve sections above described, is required. This is provided when the fingers of the sieve sections are turned into horizontal, or approximately horizontal, positions, or in other words, into the plane of the sieve surface. Under this adjustment, the rear portions of the sieve sections are turned upward, and the ridges 17 are raised to such an extent that they will make the dividing line between the material which is to be forced forward, by the air blast and the movement of the sieve, and that which will fall through the sieve, under the action of gravity.

It is further very important to note that when the sieve is thus adjusted for the separation of timothy seed, flax, or other small seed, the third ribs or so-called "abutments" 17$^b$ are raised into such position that any small stems, sticks or small pieces of weed falling thereon will be caught or retarded in their downward movement, or in other words, held, so that the air blast passing upward through the meshes of the sieve will catch and carry the same upward and forward through the said meshes or openings, and hence upward and onto the upper surfaces of the sieve.

It will now be seen when the sieve sections are closed up or turned with their fingers nearly or quite in horizontal positions, sieve openings or meshes are provided in the rear portions of the notches 2$^a$, rearward of the ridges 17, and that these openings are not only shorter, but narrower, than those provided when the sieve is adjusted as shown by dotted lines in Fig. 2.

What I claim and desire to secure by Letters Patent of the United States is as follows:

1. A sieve made up of a plurality of overlapping slats having, at their overlapping forward edges, finger portions and intervening notches, and which slats, at their intermediate portions, in line with said notches, are formed with primary and secondary dividing ridges, said secondary ridges being located below the intermediate portions of the overlying notches of the overlapping slats, substantially as described.

2. A sieve made up of a plurality of adjustable overlapped slats having, at their overlapping forward edges, longitudinally alined raised finger portions and longitudinally alined intervening notches, and which slats, at their intermediate portions, in line with said notches, are formed with primary and secondary dividing ridges, said secondary ridges being located below the intermediate portions of the overlying notches of overlapping slats, substantially as described.

3. A sieve made up of a plurality of overlapped slats having, at their overlapping rear edges, finger portions and intervening notches and having, at their intermediate portions, primary and secondary dividing ridges, said secondary dividing ridges being located below the intermediate portions of the overlying notches of overlapping slats, the said slats further having, at the rear of the said secondary dividing ridges, raised abutments or ribs, substantially as described.

4. A sieve made up of a plurality of adjustable overlapped slats, having, at their overlapping forward edges, longitudinally alined raised finger portions and longitudinally alined intervening notches, and having, at their intermediate portions, in line with said notches, primary and secondary dividing ridges, said secondary ridges being located below the intermediate portions of the overlying notches of overlapping slats, said slats further having at the rear of said secondary ridges, raised abutments or ridges, substantially as described.

5. A sieve made up of a plurality of adjustable slats having in their overlapping forward edges notches that diverge in a forwardly direction, at one angle from their rear to their intermediate portions and at an increased angle from their intermediate to their end portions, and the overlapped rear portions of said slats being formed on their upper surfaces with transverse ridges located intermediate of their pivots and rear edge portions, substantially as described.

6. A sieve made up of a plurality of pivotally adjustable overlapped slats having in their overlying forward edges diverging notches, the divergency of which increase from the intermediate to the end portions thereof, and the overlapped edge portions of said slats being inclined and formed with two transverse dividing ridges, the one located below the forward extremities of said diverging notches and the other located below the points where varying angles of the divergency of the notches intersect, substantially as described.

In testimony whereof I affix my signature in presence of two witnesses.

CHARLES CLOSZ.

Witnesses:
 MALIE HOLL,
 F. D. MERCHANT.